(12) United States Patent
Fujioka

(10) Patent No.: US 10,245,895 B2
(45) Date of Patent: Apr. 2, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 15/157,954

(22) Filed: May 18, 2016

(65) Prior Publication Data

US 2017/0066289 A1 Mar. 9, 2017

(30) Foreign Application Priority Data

Sep. 8, 2015 (JP) ................................ 2015-176739

(51) Int. Cl.
*B60C 11/12* (2006.01)
*B60C 11/11* (2006.01)

(52) U.S. Cl.
CPC ...... *B60C 11/1218* (2013.01); *B60C 11/1236* (2013.01); *B60C 11/1259* (2013.01); *B60C 11/1272* (2013.01); *B60C 11/11* (2013.01); *B60C 2011/1254* (2013.01)

(58) Field of Classification Search
CPC ..................... B60C 11/1218; B60C 2011/1254
See application file for complete search history.

(56) References Cited

U.S. PATENT DOCUMENTS

| 2006/0016533 A1 | 1/2006 | Ohashi | |
| 2008/0073011 A1* | 3/2008 | Ohashi | B60C 11/12 152/209.18 |
| 2012/0037288 A1 | 2/2012 | Sakamai | |

FOREIGN PATENT DOCUMENTS

| EP | 2 070 731 A1 | 6/2009 | |
| JP | 2002-321509 A | 11/2002 | |
| JP | 2002321509 A * | 11/2002 | ......... B60C 11/1218 |
| JP | 2004-314758 A | 11/2004 | |
| JP | 2005-104188 A | 4/2005 | |
| JP | 2006-27558 A | 2/2006 | |
| JP | 2007-22361 A | 2/2007 | |

(Continued)

OTHER PUBLICATIONS

Machine Translation: JP-2002321509-A; Ohashi, Toshiyuki; no date.*

(Continued)

*Primary Examiner* — Kendra Ly
(74) *Attorney, Agent, or Firm* — Westerman, Hattori, Daniels & Adrian, LLP

(57) ABSTRACT

A sipe is formed in a land portion of a tread surface. The sipe has a 3D sipe portion formed into a three-dimensional shape which changes along a depth direction, and a 2D sipe portion formed into a two-dimensional shape which does not change along the depth direction. The 3D sipe portion extends in the depth direction from the tread surface and terminates at a position which does not reach a sipe bottom. The 2D sipe portion extends in the depth direction from a terminated position of the 3D sipe portion and reaches the sipe bottom. The three-dimensional shape of the 3D sipe portion is formed into a sideways V-shaped form which is bent at one position in the depth direction. Both ends of the sipe are closed within the land portion.

6 Claims, 3 Drawing Sheets

(56) References Cited

FOREIGN PATENT DOCUMENTS

JP          2011204155 A   * 10/2011
WO          2006/001446 A1    1/2006

OTHER PUBLICATIONS

Machine Translation: JP 2011-204155; Kachi, Yoshio; (Year: 2018).*
Office Action dated Jul. 27, 2017, issued in counterpart Chinese Application No. 201610807132.4, with English translation. (12 pages).
Office Action dated Feb. 9, 2018, issued in counterpart Chinese Application No. 201610807132.4, with English translation (10 pages).
Office Action dated Sep. 12, 2018, issued in counterpart Chinese Application No. 201610807132.4, with English translation. (11 pages).

* cited by examiner

PNEUMATIC TIRE

BACKGROUND OF THE INVENTION

Field of the Invention

The present invention relates to a pneumatic tire in which a sipe is formed in a land portion of a tread surface.

Description of the Related Art

Conventionally, there has been known a pneumatic tire in which a cut called as a sipe is formed in a land portion such as a block or a rib for the purpose of enhancing a traveling performance on a wet road surface or an ice road surface. A two-dimensional sipe formed into a two-dimensional shape which is not changed in its shape along a depth direction has been known as the sipe mentioned above, and a plane sipe and a wavy sipe are put to practical use. Further, a three-dimensional sipe formed into a three-dimensional shape which is changed in its shape along a depth direction has been known, and is disclosed, for example, in Patent Documents 1 to 6.

Since the two-dimensional sipe is not suppressed from deforming along a width direction of the sipe as is different from the three-dimensional sipe, an opening portion of the sipe tends to move, and the sipe is opened widely in connection with tolling motion. Further, even in the three-dimensional sipe, in the case that the sipe is formed into a two-dimensional shape in a tread surface side, like the tires described in the Patent Documents 1 and 2, the sipe is widely opened in the same manner. As a result, a so-called stone holding that a pebble on the road surface makes an intrusion into the sipe is generated in an incrementing manner, and a strain is concentrated in a sipe bottom, so that a sipe crack may be generated.

On the other hand, in the case that a whole area of a wall surface of the sipe is formed into the three-dimensional shape such as the tires, for example, described in the Patent Documents 3 to 6, the cured tire is closely attached to a mold and a mold releasing performance tends to be deteriorated. The reason is that a lot of bent portions are included in the wall surface of the three-dimensional sipe mentioned above, and a resistance at a time when a blade for forming the sipe is pulled out of the tire is great. In a both-sides closed sipe which is closed in both ends, the problem of the mold releasing performance is significant in addition to the problems of the stone holding and the sipe crack mentioned above, and a method which can improve the problem is desired.

PRIOR ART DOCUMENT

Patent Document

Patent Document 1: JP-A-2004-314758
Patent Document 2: JP-A-2006-27558
Patent Document 3: JP-A-2002-321509
Patent Document 4: JP-A-2005-104188
Patent Document 5: WO2006/001446
Patent Document 6: JP-A-2007-22361

SUMMARY OF THE INVENTION

The present invention is made by taking the actual condition mentioned above into consideration, and an object of the present invention is to provide a pneumatic tire which can secure a stone holding resistance and a sipe crack resistance while being a both-sides closed sipe, and can achieve an excel lent mold releasing performance.

The object can be achieved by the following present invention. The present invention provides a pneumatic tire comprising a sipe formed in a land portion of a tread surface, wherein the sipe has a 3D sipe portion formed into a three-dimensional shape which changes along a depth direction, and a 2D sipe portion formed into a two-dimensional shape which does not change along the depth direction, wherein the 3D sipe portion extends in the depth direction from the tread surface and terminates at a position which does not reach a sipe bottom, and the 2D sipe portion extends in the depth direction from a terminated position of the 3D sipe portion and reaches the sipe bottom, wherein the three-dimensional shape of the 3D sipe portion is formed into a sideways V-shaped form which is bent at one position in the depth direction, and wherein both ends of the sipe are closed within the land portion.

In the tire, since the 3D sipe portion formed into the three-dimensional shape is provided in the tread surface side of the sipe, the sipe is not excessively opened in connection with the rolling motion. Further, the three-dimensional shape of the 3D sipe portion is bent only at one position in the depth direction, and the area from the midstream in the depth direction to the sipe bottom is provided as the 2D sipe portion. Accordingly, the resistance when the blade is pulled out of the tire can be lightened. As a result, although the sipe is the both-sides closed sipe, the stone holding resistance and the sipe crack resistance can be secured, and it is possible to achieve an excellent mold releasing performance.

It is preferable that a distance K1 from the tread surface to the terminated position of the 3D sipe portion is between 20% and 70% of a sipe depth. As a result, the sizes of the 3D sipe portion and the 2D sipe portion can be appropriately secured. The 3D sipe portion is reduced or eliminated in a state after a middle stage of the wear; however, since the rigidity of the land portion is comparatively higher in the stage, it is possible to inhibit the sipe from being excessively opened. It is preferable that a distance K2 from the tread surface to a bent portion in the three-dimensional shape of the 3D sipe portion is between 40% and 60% of the distance K1.

DETAILED DESCRIPTION OF THE PREFERRED EMBODIMENTS

An embodiment of the present invention will be explained with reference to the drawings.

Figure 1:
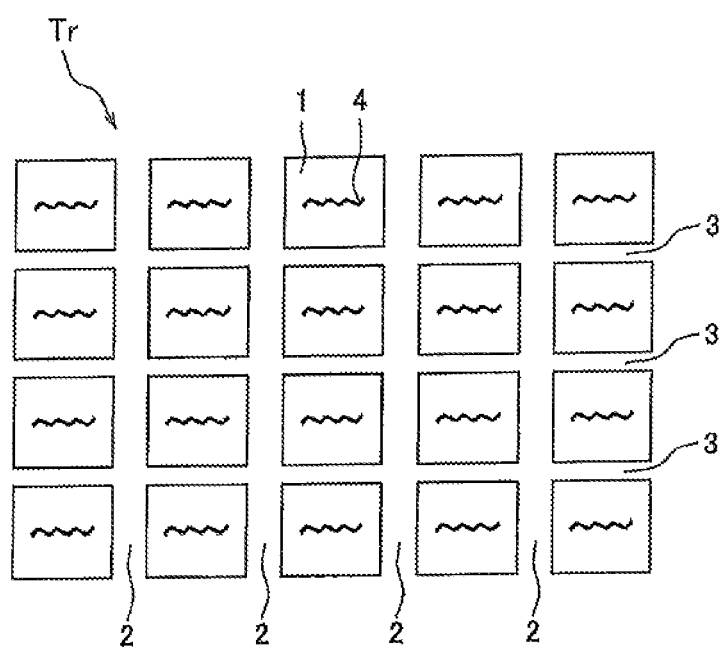
FIG. 1 is a plan view showing an example of a tread surface of a pneumatic tire according to the present invention.

Blocks 1 serving as land portions are provided in a tread surface Tr shown in FIG. 1. Each of the blocks 1 is sectioned by main grooves 2 and lateral grooves 3. The main groove 2 extends continuously in a tire circumferential direction, and the lateral groove 3 extends in a direction intersecting the main groove 2. The block 1 is formed into a rectangular shape in a plan view, however, is not limited to this. In place of or in addition to the blocks mentioned above, ribs extending continuously in the tire circumferential direction may be provided as the land portions.

Figure 2:
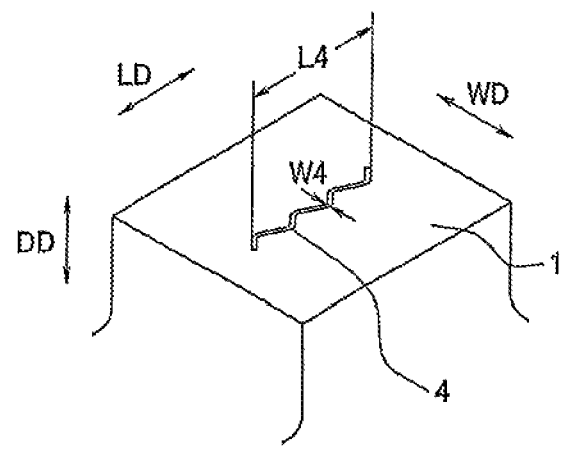
FIG. 2 is a perspective view of a block.

As shown in FIG. 2 in an enlarged manner, a sipe 4 is formed in the block 1. The sipe 4 extends in a tire width direction which is a lateral direction in FIG. 1. In order to improve a traveling performance, particularly a start moving performance and a braking performance on a wet road surface and an ice road surface, it is preferable that the sipe 4 extends in the direction intersecting with the tire circumferential direction as mentioned above. At least one sipe may be formed in the block 1. Therefore, a plurality of sipes 4, for example, arranged at intervals in the tire circumferential direction may be provided in one block 1.

A length direction LD is a length direction of the sipe 4, and is the same direction as the tire width direction in the present embodiment. A sipe length L4 is measured as a linear distance between both ends of the sipe 4. A depth direction DD is a depth direction of the sipe 4. A sipe depth D4 (refer to FIG. 3(c)) is measured as a linear distance from the tread surface to a sipe bottom. The sipe depth D4 is set, for example, to 40% to 80% of a depth of the main groove 2. A width direction WD is a width direction of the sipe 4, and is the same direction as the tire circumferential direction in the present embodiment. A sipe width W4 is set, for example, to 0.3 mm to 2.0 mm, for achieving a sufficient edge effect.

Figure 3:
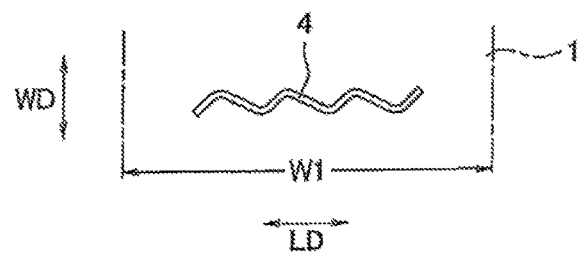
FIGS. 3(a), 3(b) and 3(c) are three-plane views of a sipe.
Figure 3:
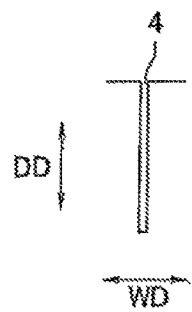
Figure 3:
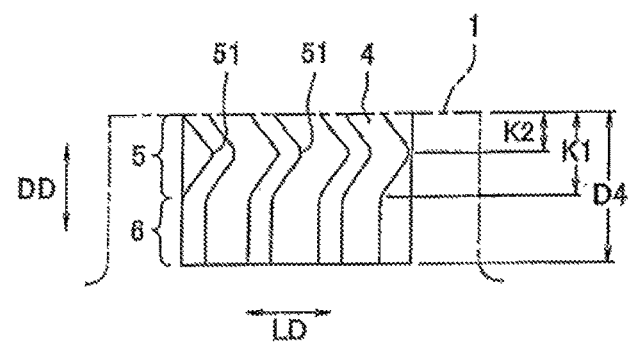
Figure 4:
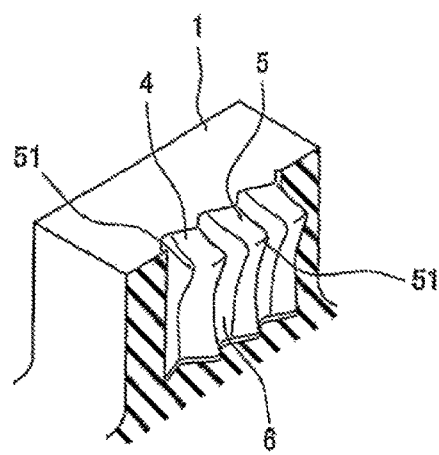
FIG. 4 is a perspective view showing a wall surface of the sipe.

FIG. 3 is three-plane view including FIG. 3(a) which is a plan view of the sipe 4, FIG. 3(b) which is a side view thereof and FIG. 3(c) which is a front view thereof. FIG. 4 is a perspective view showing a wall surface of the sipe 4. As shown in FIGS. 3 and 4, the sipe 4 formed in the block 1 of the tread surface Tr has a 3D sipe portion 5 formed into a three-dimensional shape which is changed along the depth direction DD, and a 2D sipe portion 6 formed into a two-dimensional shape which is not changed along the depth direction DD. The 3D sipe portion 5 extends in the depth direction DD from the tread surface and terminates at a position which does not reach the sipe bottom, and the 2D sipe portion 6 extends in the depth direction DD from the terminated position of the 3D sipe portion 5 and reaches the sipe bottom.

As shown in FIG. 3(c), the three-dimensional shape of the 3D sipe portion 5 is formed into a sideways V-shaped form which is bent at one position in the depth direction DD. Concavo-convex lines extending in the depth direction DD while having an amplitude in the length direction LD are provided on the wall surface. The concavo-convex line is provided with a portion which is inclined to one direction of the length direction LD, and a portion which is inclined to an opposite direction thereto, and they are connected to each other in the depth direction DD via one bent portion 51. A concavo-convex line of the 3D sipe portion 5 is smoothly connected to a concavo-convex line of the 2D sipe portion 6.

The 3D sipe portion 5 is opened at the tread surface of the block 1, and the opening is formed into a wavy shape which extends along the length direction LD while bending in the width direction WD. In the present embodiment, since the wavy shape is formed by alternately repeating short sides and long sides, the motion of the opening tends to be restricted in comparison with a wavy shape formed by repeating sides having the same length, and it is possible to well suppress the opening of the sipe 4 in connection with the rolling motion.

The two-dimensional shape of the 2D sipe portion 6 are formed into a wavy shape, and are provided in their wall surface with concavo-convex lines which extend in the depth direction DD. The 2D sipe portion 6 may be constructed by a plane sipe which is formed flat in its wall surface, however, can be smoothly connected to the 3D sipe portion 5 by being constructed by the wavy sipe like the present embodiment.

The sipe 4 is formed as a both-sides closed sipe which has both ends closed within the block 1. In the both-sides closed sipe as mentioned above, the intruding pebble is hard to be discharged in comparison with the sipe having an open sipe end. Therefore, the stone holding tends to become a problem, thereby adversely affecting a sipe crack resistance. Further, in the both-sides closed sipe, a resistance for pulling out the blade for forming the sipe tends to be greater in a curing step of the tire, and the blade may break off. As a result, a mold releasing performance tends to become a problem.

In order to secure an advantageous effect by the 3D sipe portion 5 mentioned later, the sipe length L4 is preferably equal to or more than 30% of the block width W1 in the length direction LD, more preferably equal to or more than 50%, and further preferably equal to or more than 70%. The sipe length L4 is set, for example, to be equal to or less than 90% of the block width W1.

In the tire, since the 3D sipe portion 5 formed into the three-dimensional shape is provided in the tread surface side of the sipe 4, the sipe 4 is not excessively opened in connection with the rolling motion. According to the present embodiment, the wall surfaces of the 3D sipe portions 5 each formed into the three-dimensional shape engage with each other when the block 1 is going to deform in a back and forth direction by an action of an external force along the width direction WD in connection with the rolling motion of the tire. As a result, the deformation of the block 1 is suppressed, and the opening of the sipe 4 is further suppressed. An effect of reducing a noise caused by a pumping sound can be obtained by suppressing the opening and closing of the sipe 4 as mentioned above.

Further, the three-dimensional shape of the 3D sipe portion 5 is bent only at one position in the depth direction DD, and the area from the middle of the depth direction DD to the sipe bottom is provided as the 2D sipe portion 6. Therefore, the resistance when the blade is pulled out of the tire can be lightened in the curing step of the tire. As mentioned above, in spite of the sipe 4 formed in the block 1 and constructed as the both-sides closed sipe, it is possible to secure the stone holding resistance and the sipe crack resistance, and it is possible to achieve an excellent mold releasing performance.

A distance K1 (refer to FIG. 3(c)) from the tread surface to a terminated position of the 3D sipe portion 5 is preferably between 20% and 70% of the sipe depth D4. As a result, the sizes of the 3D sipe portion 5 and the 2D sipe portion 6 can be appropriately secured. The distance K1 is more preferably equal to or more than 30% of the sipe depth D4, and further preferably equal to more than 40%. Further, the distance K1 is more preferably equal to or less than 60% of the sipe depth D4. A distance K2 from the tread surface to a bent portion 51 in the three-dimensional shape of the 3D sipe portion is preferably between 40% and 60% of the distance K1.

Since the 3D sipe portion 5 is terminated in the middle of the depth direction DD in the sipe 4, the 3D sipe portion 5 is reduced or eliminated in a stage after the middle stage of the wear. However, the height of the block 3 is reduced in the stage, and the rigidity of the block 1 becomes comparatively higher in comparison with before the stage. Accordingly, the sipe 4 is not excessively opened in connection with the rolling motion, and it is possible to suppress the stone holding resistance and the sipe crack resistance from being deteriorated.

The pneumatic tire according to the present invention can be constructed in the same manner as the normal pneumatic tire except the matter that the sipe as mentioned above is formed in the land portion such as the block or the rib. Therefore, it is possible to employ any conventionally known materials and manufacturing methods.

The present invention is not limited to the embodiment mentioned above, but can be improved and modified variously within the scope of the present invention.

EXAMPLES

A description will be given below of an example which specifically shows the structure and the effect of the present invention. Evaluation of each of performances of the tire was executed as follows.
(1) Stone Holding Resistance A tire assembled to a rim of 22.5×7.50 and having a size 11R22.5 was installed to a vehicle having a fixed load capacity 10t and was filled with internal pressure 700 kPa. The number of the pebbles making an intrusion into the sipes of the tire after traveling for 20000 km was counted and a reciprocal number thereof was indexed. As the index number is greater, the stone holding decreases, thereby indicating the excellent stone holding resistance.
(2) Sipe Crack Resistance The sipes of the tire after traveling for 20000 km was observed, the number and the length of the cracks in the bottom of the sipe were measured, and a reciprocal number thereof was indexed. As the index is greater, the crack in the bottom of the sipe decreases, thereby exhibiting the excellent sipe crack resistance.
(3) Mold Releasing Performance The curing step was applied to fifty tires, the number of the tires in which the close attachment to a mold was generated at the mold releasing time due to the blade for forming the sipe was counted, and a reciprocal number thereof was indexed. As the index number is greater, the close attachment to the mold decreases, thereby exhibiting the excellent mold releasing performance.

Figure 5:
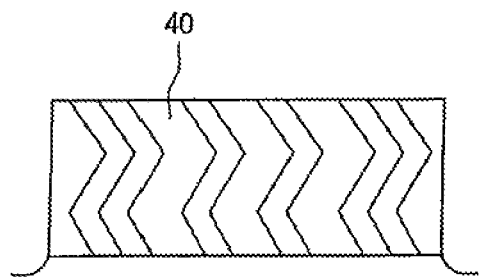
FIG. 5 is a front view or a sipe in a tire according to a comparative example.

The tires according to the working example and the comparative example provided for the performance evaluation mentioned above have the common structures except the shape of the sipe. In the working example and the comparative example, the sipes shown in FIGS. 3 and 5 are respectively formed in all the blocks in the tread surfaces. The sipe 40 in FIG. 5 has only the three-dimensional shape which corresponds to the 3D sipe portion shown in FIG. 3, and is provided in its wall surface with concavo-convex lines which are bent at two positions in the depth direction of the sipe. Results of evaluation are shown in Table 1.

TABLE 1

|  | Comparative example | Working example |
|---|---|---|
| Sipe shape | FIG. 5 | FIG. 3 |
| Stone holding resistance | 100 | 100 |
| Sipe crack resistance | 100 | 101 |
| Mold releasing performance | 100 | 116 |

As shown in Table 1, it is possible to achieve an excellent mold releasing performance while securing the stone holding resistance and the sipe crack resistance in the working example.

What is claimed is:

1. A pneumatic tire comprising:
   a sipe formed in a land portion of a tread surface,
   wherein the sipe has a 3D sipe portion formed into a three-dimensional shape which changes along a depth direction, and a 2D sipe portion formed into a two-dimensional shape which does not change along the depth direction,
   wherein the 3D sipe portion extends in the depth direction from the tread surface and terminates at a position which does not reach a sipe bottom, and the 2D sipe portion extends in the depth direction from a terminated position of the 3D sipe portion and reaches the sipe bottom,
   wherein the three-dimensional shape of the 3D sipe portion is formed into a sideways V-shaped form which is bent at only one position in the depth direction, and
   wherein both ends of the sipe are closed within the land portion.

2. The pneumatic tire according to claim 1, wherein a distance K1 from the tread surface to the terminated position of the 3D sipe portion is between 20% and 70% of a sipe depth.

3. The pneumatic tire according to claim 2, wherein a distance K2 from the tread surface to a bent portion in the three-dimensional shape of the 3D sipe portion is between 40% and 60% of the distance K1.

4. The pneumatic tire according to claim 1, wherein the sipe has a width of 0.3 mm to 2.0 mm.

5. The pneumatic tire according to claim 1, wherein a length of the sipe is up to 90% of a block width.

6. The pneumatic tire according to claim 1, wherein the 2D sipe portion is formed by a plane sipe which is formed flat in its wall surface.

* * * * *